United States Patent [19]

Bryan

[11] 4,389,369
[45] Jun. 21, 1983

[54] BI-METALLIC GRID FOR A NUCLEAR REACTOR FUEL ASSEMBLY

[75] Inventor: William J. Bryan, Penn Township, Westmoreland County, Pa.

[73] Assignee: Westinghouse Electric Corp., Pittsburgh, Pa.

[21] Appl. No.: 176,626

[22] Filed: Aug. 11, 1980

[51] Int. Cl.³ .............................................. G21C 3/34
[52] U.S. Cl. ...................................... 376/442; 376/438
[58] Field of Search ........................... 376/434, 438, 442

[56] References Cited

U.S. PATENT DOCUMENTS

| | | | |
|---|---|---|---|
| 3,629,067 | 12/1971 | Demalson | 376/442 |
| 3,674,635 | 7/1972 | Anthony | 376/442 |
| 3,833,471 | 9/1974 | Chetter | 376/442 |
| 4,021,300 | 5/1977 | Marshall | 376/442 |
| 4,077,843 | 3/1978 | Patterson | 376/442 |

*Primary Examiner*—Donald P. Walsh

*Attorney, Agent, or Firm*—Z. L. Dermer

[57] ABSTRACT

A grid for a nuclear reactor fuel assembly which includes two sets of interwoven straps which form square openings of egg-crate configuration. One set is placed on top the other with the openings in alignment to receive fuel rods. The vertically aligned square openings thus constitute single cells through which fuel rods are adapted to extend. The top edges of straps in the bottom grid are provided with narrow slots which extend in multiple rows diagonally across the grid when the straps are assembled. A spring, one for each row of diagonal slots, is threaded through the slots before the top grid is set in place. Each single cell contains two pairs of vertically spaced dimples on adjacent walls of the straps as in conventional construction. That portion of the spring, which extends through each cell, engages a side of the fuel rod in the cell and urges it into contact with the dimples, thus providing five points of support for each fuel rod which extends through the cells.

5 Claims, 10 Drawing Figures

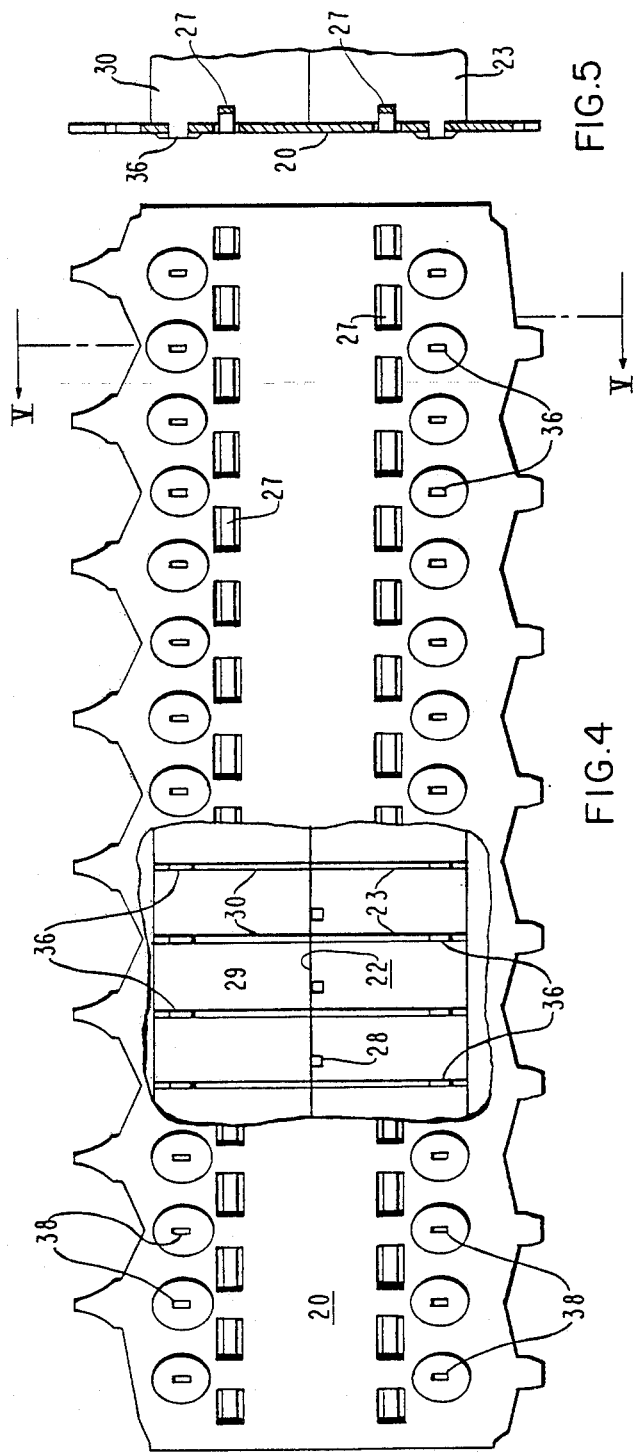

BI-METALLIC GRID FOR A NUCLEAR REACTOR FUEL ASSEMBLY

BACKGROUND OF THE INVENTION

The invention described herein relates to nuclear reactor fuel assemblies and more particularly to a fuel assembly grid designed to improve reactor performance and to be manufactured at a cost less than conventional grids.

Commercial nuclear reactors used for generating electric power include a core composed of a multitude of fuel assemblies which generate heat used for electric power generation purposes. Each fuel assembly includes an array of fuel rods and control rod guide tubes held in spaced relationship with each other by grids of egg-crate configuration spaced along the fuel assembly length. The fuel rods may be approximately 0.5 inch in diameter and about 14 feet long thus requiring a number of supporting grids along their length. Each grid includes interwoven Inconel or Zircaloy straps which form multiple cells, each cell having springs on two adjacent walls and a pair of projections or dimples on each of the other two walls forming a cell. The springs laterally impress resistive forces on each fuel rod in the assembly. Although this fuel assembly design performs exceptionally well in a nuclear reactor, one disadvantage inherent in the design is that the the inwardly projecting springs and dimples occasionally mar or score the surface of fuel rods during the time they are being pulled into the fuel assembly grids. In carrying out this fuel rod loading operation, the grids are held immovably in position while a longitudinal steel rod attached to the end of a fuel rod pulls it axially through the aligned openings or cells in the grids. As the rod engages the springs and dimples in the grid cells, their edges engage the exposed relatively soft surface of the moving fuel rod and, in some cases, score its surface sufficiently deep as to cause the rod to fall outside established fuel rod surface specifications.

Also, the grid strap material from which the springs and dimples are formed has a high neutron capture cross section, particularly when made of Inconel. Although annealed Zircaloy is not as deleterious, to some extent it adversely affects reactor performance and efficiency. The best balance between material stiffness and low neutron capture cross section should be reached for efficiency purposes.

SUMMARY OF THE INVENTION

Briefly stated, in accordance with the teachings of this invention, the above disadvantages are overcome by providing an improved design of fuel assembly grid wherein the grid body comprises two separate sets of interwoven straps, each formed to egg-crate configuration and positioned vertically with respect to each other. One set of interwoven straps is placed on top the other and both sets are held against longitudinal or radial movement by a peripheral strap to which the ends of the straps are welded. The square openings thus formed in the juxtaposed sets of straps are aligned with each other to receive fuel rods which extend axially therethrough. Each cell which comprises the aligned square openings on the strap sets, contains a pair of spaced dimples on each of two adjacent straps facing each cell and are arranged to provide lateral support to a fuel rod. The force applied laterally to a fuel rod in each cell is provided by a spring arranged to extend diagonally across the grid with a portion in each cell designed to engage a side of a fuel rod opposite from the dimples. It will occur to those skilled in the art that the height of the grids can be reduced by virtue of the elimination of spring members heretofore found in the middle of each grid strap.

BRIEF DESCRIPTION OF THE DRAWINGS

While the foregoing discussion identifies problems presently existing in the prior art together with a general description of how they may be overcome, it is believed the following disclosure of the preferred embodiment of the invention will be better understood by reference to the accompanying drawings wherein:

FIG. 4 is a view in elevation showing the outer surface of a peripheral strap used for surrounding the interlaced grid straps of FIGS. 2 and 3;

FIG. 5 is a view taken on lines V—V of FIG. 4 of the strap illustrated in FIG. 3;

DESCRIPTION OF THE PREFERRED EMBODIMENT

Figure 1:
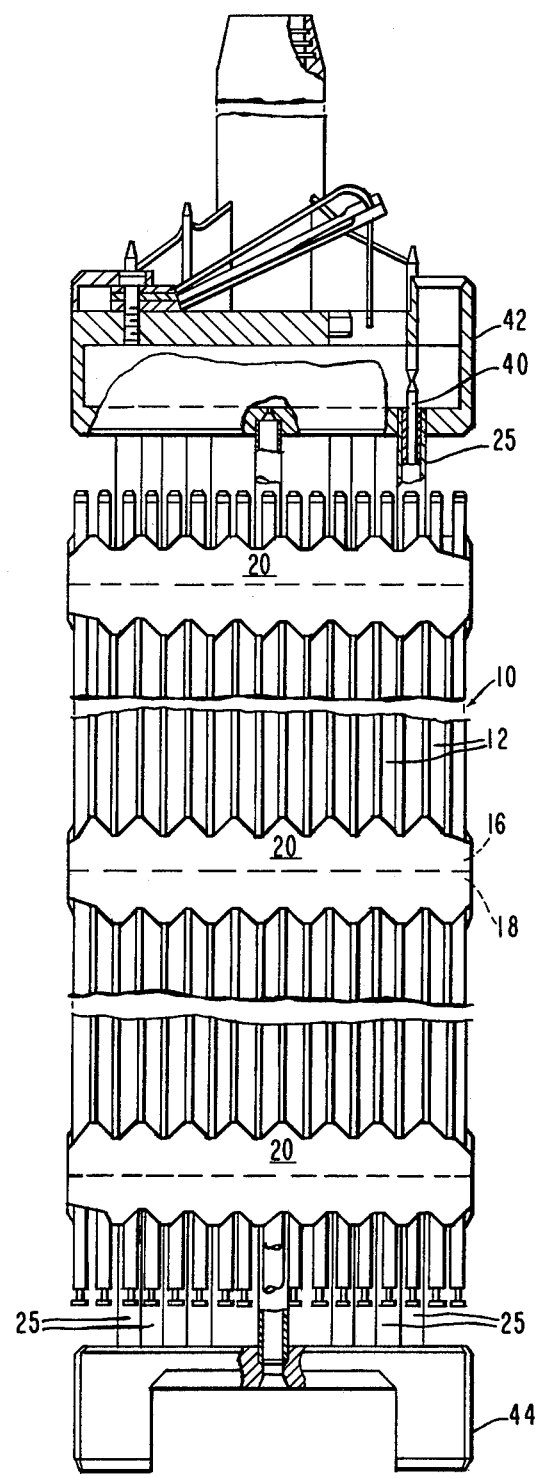
FIG. 1 is a view in elevation, partly in section, of a fuel assembly illustrating the relationship of the grids of the invention to other components in the assembly.

Referring now to the drawings wherein like reference characters designate like or corresponding parts throughout the several views, there is shown in FIG. 1 a nuclear reactor fuel assembly 10 comprising an array of fuel rods 12 held in spaced relationship with each other by grids 14 spaced along the fuel assembly length. Each grid includes top and bottom sections 16, 18 and a peripheral strap 20.

Referring more specifically to grid 14 shown in FIGS. 2-6, each top and bottom section 16, 18 includes multiple straps 22, 23, (FIGS. 2-6) made of Zircaloy, Inconel or other material, interwoven to form two separate grid sections of egg-crate configuration. The square-shaped openings 24 thus formed in each section 16, 18, are vertically aligned to form cells, and are of a size sufficient to receive fuel rods 12 or control rod guide tubes 25.

Figure 2A:
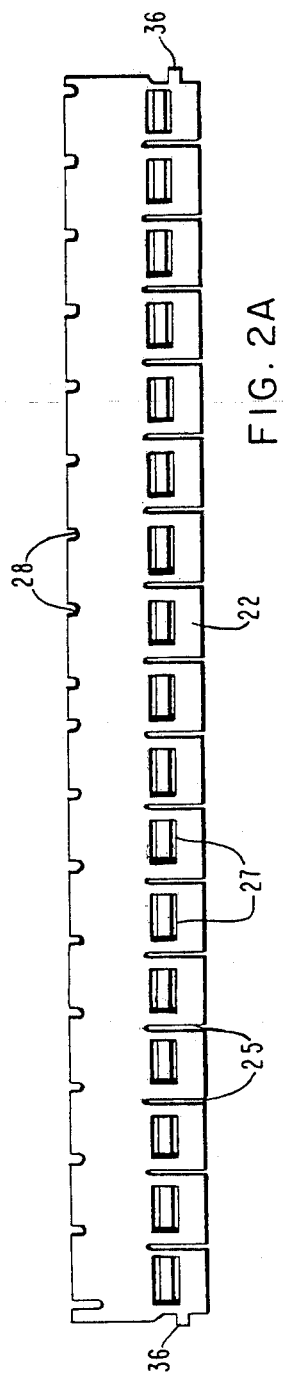
FIGS. 2A and 2B are elevation views of grid straps which when interlaced, form a bottom portion of the grid of this invention.
Figure 2B:
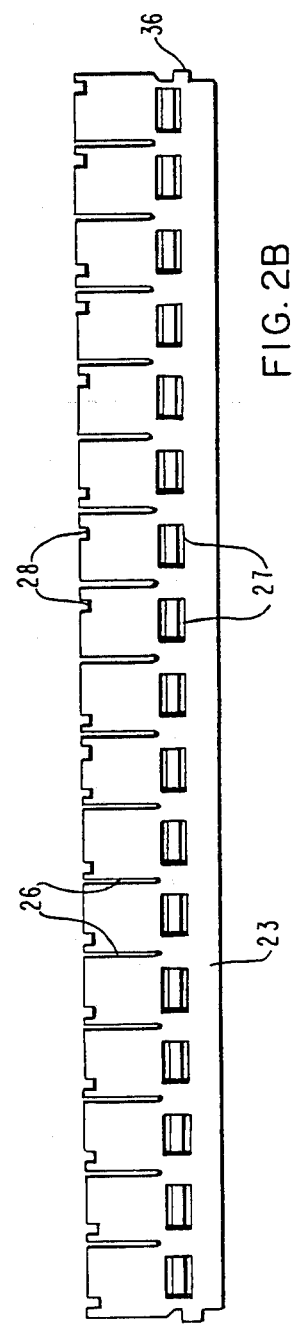

The bottom section 18 comprises a set of interwoven straps 22, 23 and as shown in FIGS. 2A and 2B. It includes slots 25, 26 which facilitate strap interleaving at right angles to each other in a manner well known in the art. Dimples 27 project inwardly from the walls of adjacent straps in each section as shown, thus providing a pair of vertically aligned dimples in each cell. The difference over conventional designs is that the upper wall of each strap includes slots 28, a total of two slots for every cell, to accommodate a spring as more fully described hereinafter.

Figure 3A:
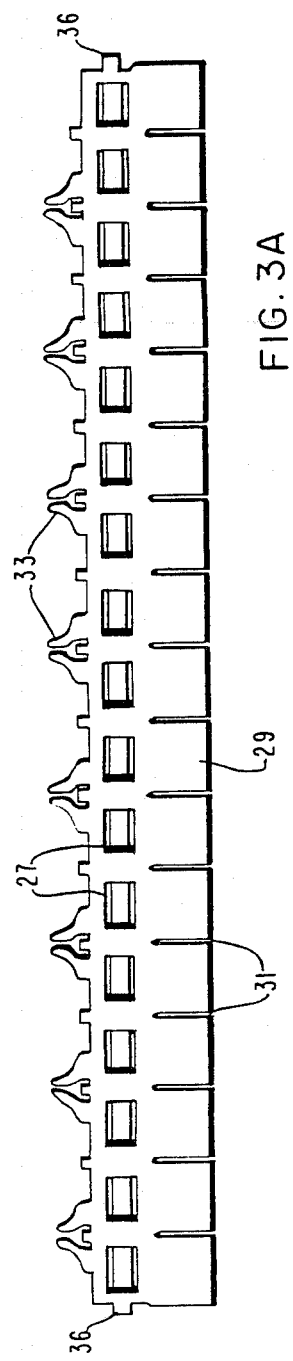
FIGS. 3A and 3B are elevation views of grid straps which when interlaced, form the top portion of the grid of this invention.
Figure 3B:
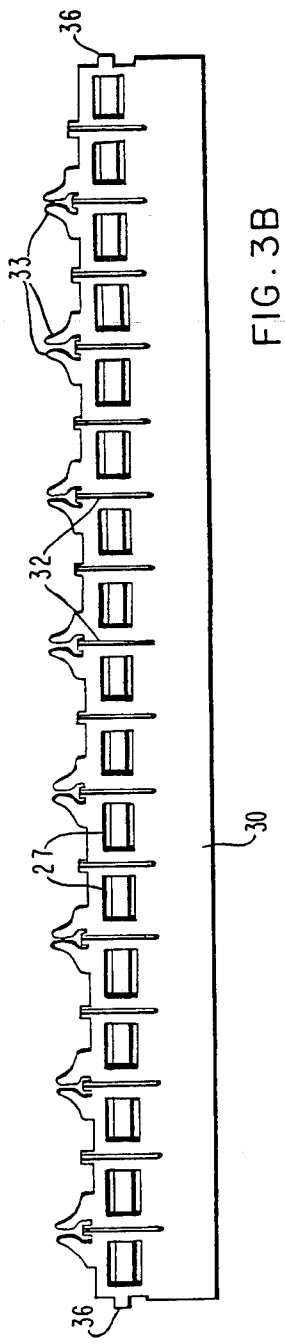

The top section 16 of grid 14 shown in FIGS. 3A and 3B includes similar straps 29, 30 having slots 31, 32 to facilitate interleaving and dimples 27 as described above. The top wall of straps 29, 30 contains coolant flow directing vanes 33 of conventional design.

Figure 6:
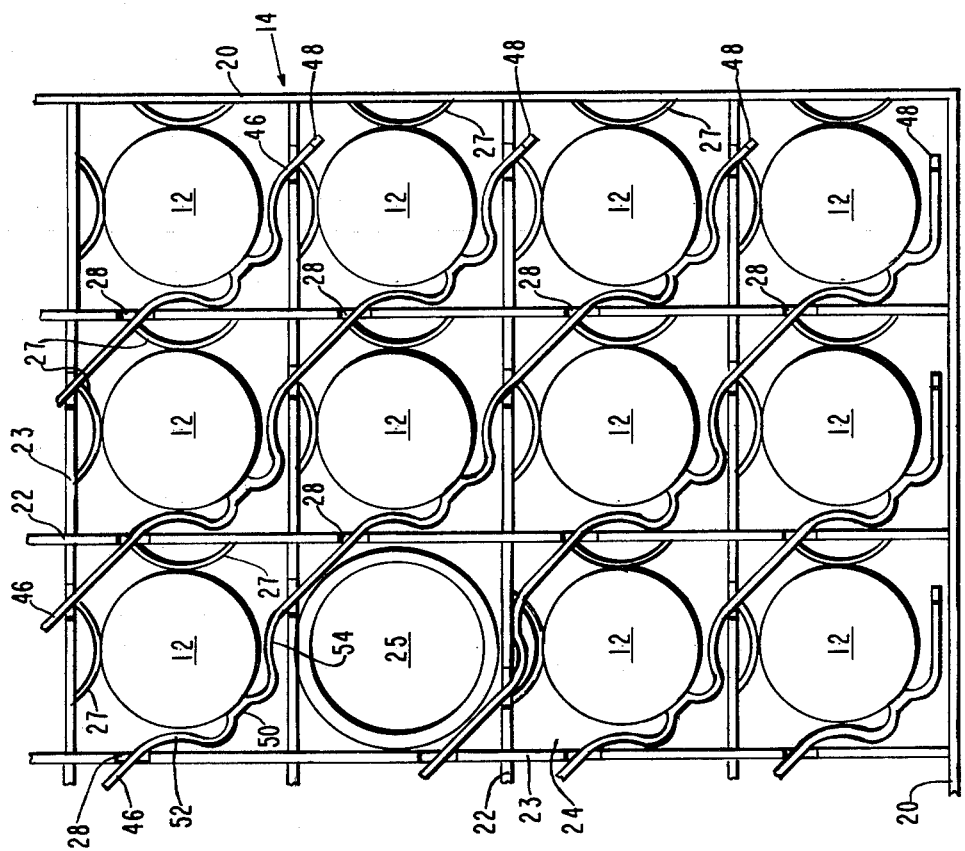
FIG. 6 is a plan view of a portion of the grid illustrating the relationship of springs, dimples and straps used for holding fuel rod guide thimbles in a set position.

When the bottom section straps 22, 23 and the top section straps 29, 30 are separately interwoven, they form the egg-crate design shown in FIGS. 4–6. The grid section 16 is placed on top section 18 with the section 16 straps directly overlying section 18 straps to form the cells 24.

These two grid sections 16, 18 are held together by the peripheral strap 20 which surrounds the juxtaposed grid sections. This is accomplished by short tabs 36 which project longitudinally outwardly from the end of each strap and fit into an openings 38 punched out of the peripheral strap material. After the tabs on each strap have been placed in their corresponding openings 38 in the peripheral strap, and welded to the peripheral strap body, it will be evident that the top and bottom grid sections 16, 18 will be placed in contact with each other or precisely spaced vertically for any selected distance, and will be precluded from moving relative to each other. This arrangement effectively merges the two grid sections 16, 18 into a single grid body which then serves the function of a single grid.

In assemblying a fuel assembly, an array of control rod guide tubes 25, FIG. 1, having control rods 40 adapted for slidable longitudinal movement therein, are positioned to extend axially through selected cells in the grid and are thereupon welded to grid tabs or strap walls to form the fuel assembly skeleton structure. Opposite ends of the guide tubes are attached to top and bottom nozzles 42, 44 in the usual manner.

Reference to the plan view of FIG. 6 will show the relative disposition of fuel rods and guide tubes, and particularly, how the fuel rods are held in a relatively immovable position in each grid. Each fuel rod 12 is biased by a spring 46 into engagement with dimples 27 formed on the grid strap walls, and as shown, project inwardly into each cell 24. This construction serves to preclude axial movement of the fuel rods in their grids during the time the fuel assembly is being moved or transferred from one location to another. The dimples are impressed in both the egg-crate straps 22, 23, 29 and 30, and peripheral strap 20, during the strap punching operation. After the appropriate grid straps are assembled into the form of a grid, the dimples project into each cell, except the cells having control rod guide tubes, from two adjacent walls as shown. Both dimples on the bottom grid section are vertically aligned with dimples immediately thereabove on the top grid section.

To facilitate the installation of multiple springs 46 diagonally in the grids, the top edge of straps 22, 23 are equipped with multiple notches 28, into each of which the spring is threaded before the top section 18 is placed in position. The spring is appropriately bent along its length to accommodate or fit into the relatively limited space in each cell in the manner shown. After all springs are located in their respective slots, top grid 16 is placed on top of lower grid 18 with the square openings in each grid being axially aligned to form cells 24. Peripheral strap 20 is then wrapped around the grids, tabs 36 are inserted in openings 38 in the peripheral strap and then welded in place. This procedure serves to not only lock or capture each spring in each cell, but it also acts to firmly bond the strap tabs to the peripheral strip and thus form the desired rigid construction.

Figure 7:
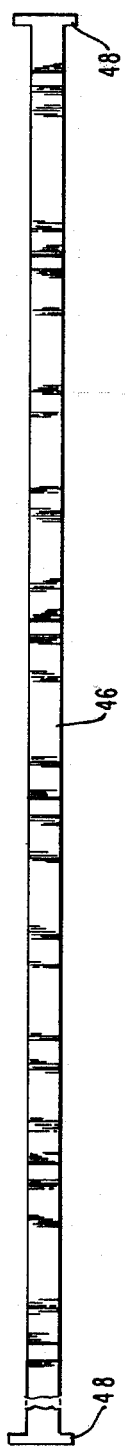
FIG. 7 is a view in elevation of the springs shown in FIG. 6.
Figure 8:
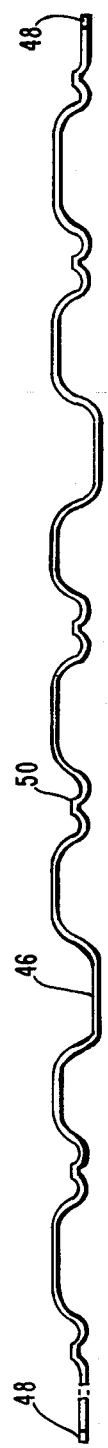
FIG. 8 is a plan view of the springs shown in FIG. 7.

Referring to FIGS. 6 and 7, it will be seen that the spring segment 50 in each cell contacts the surface of fuel rod 12 and urges it into contact with dimples 27 to help support the fuel rod in position. With this arrangement, the fuel rod is subjected to 5-point support: Two dimples, one above the other on adjacent straps in the top and bottom sections, bear on the fuel rod at spaced intervals of 90 degrees to provide four points of support. The other support point resides in the spring which contacts the fuel rod at a point intermediate the upper and lower dimples and at the peak of a triangle that has a space extending between two horizontally disposed dimples.

The spring 34 initially comprises flat stock and is bent to the configuration shown and with a spring constant sufficient to always contact the fuel rod surface at least on one point. When the spring is initially set in position, as a fuel rod is drawn into a cell 24, it is initially contacted by center spring section 50 to thus hold the fuel rod when the assembly is transported to different areas. After it is irradiated and exposed to significant heat in a reactor during operation, the Zircaloy straps and Inconel spring materials relax but spring section 50 will still contact the fuel rod to bias it against the dimples. It will be obvious to those skilled in the art that spring sections 52 and/or 54 may also contact the fuel rod, in addition to section 50, at the time of assembly of fuel rods into the grids.

In order to preclude escape of the spring from its slots and into the reactor coolant in the event of breakage, each end of the spring includes an enlarged T-shaped end 48 which is of greater size than the slots through which it extends. The ends 48 of those springs which terminate in the corner of the grid do not penetrate the peripheral strap, but remain inside the grid and bear against the strap inner surface as shown in the lower right quadrant of FIG. 6. The end of the spring also terminates in the diagonally disposed corner cell in the same manner. Those springs which occupy the lower left and upper right corners have their ends extending through adjacent straps, as shown, to lock them in position.

It will be apparent that many modifications and variations are possible in light of the above teachings. It therefore is to be understood that within the scope of the appended claims, the invention may be practiced other than as specifically described.

I claim:

1. An assembled grid for holding fuel rods and control rod guide tubes in spaced relationship with each other in a nuclear reactor fuel assembly comprising:

a first set of straps interleaved at right angles to each other to form multiple openings of square configuration;

a second set of straps interleaved at right angles to each other to form multiple openings of square configuration and of a size the same as the openings formed by the first set of straps;

said second set of straps being mounted on top the first set of straps in a manner wherein the openings in each of said sets are in axial alignment with each other to form multiple cells;

a pair of dimples projecting inwardly into a predetermined number of said cells adapted to receive nuclear fuel rods therein from the cell walls formed by two adjacent straps in the first and second strap sets, thus providing two sets of vertically aligned dimples in each cell; the other two walls of said predetermined number of cells other than those cells on the periphery of said grid each having a slot therein at a location spaced from the corners of each said cell;

a peripheral strap surrounding said top and bottom sets of straps, the ends of said interleaved straps being bonded to the peripheral strap to thus hold the top and bottom strap sets in immovable relationship with respect to each other;

multiple spring means extending across said cells from one side of the assembled grid to the other, each of said spring means being unitary and extending through a plurality of generally diagonally aligned contiguous cells through said slots in said other two walls and having a segment which biases a fuel rod adapted to extend through each of said predetermined number of cells into engagement with said dimples to provide at least five points of support to said fuel rod.

2. The assembled grid according to claim 1 wherein said multiple spring means include individual elongated strip springs extending diagonally across the assembled grid and positioned intermediate the dimples of said upper and said lower straps of said grid;

an elongated tab on both ends of each of said strip springs and of a size greater than the size of said slots;

whereby any of said springs is precluded from escaping into the reactor coolant in the event of spring breakage.

3. The assembled grid according to claim 2 wherein the segment of each of said springs which is located in each said cell include two or more portions arranged to contact the fuel rod at the time it is first pulled into the grid to thereby provide support thereto during the time the fuel assembly is transferred from one area to another; and the constant for each of said springs being chosen such that after the straps and springs have been exposed to irradiation and the temperatures of an operating reactor, the springs relax to provide a single biasing point which urges the fuel rod into engagement with the dimples located on the other side thereof.

4. The assembled grid according to claim 1 wherein said peripheral strap surrounding the top and bottom grids is of a height sufficient to cover the straps of both grids, said peripheral strap being bonded to tabs extending longitudinally outward from the end of the interleaved straps.

5. The assembled grid according to claim 2 wherein said strip springs each have each of their ends terminating freely in the peripheral openings in said grid.

* * * * *